(12) United States Patent
Bhatia et al.

(10) Patent No.: US 8,990,169 B2
(45) Date of Patent: Mar. 24, 2015

(54) STATISTICS COLLECTION FOR DATABASE TABLES

(75) Inventors: Dimple Bhatia, San Jose, CA (US); John F. Hornibrook, Markham (CA); Harold Hotelling Lee, San Jose, CA (US); Eileen Tien Lin, San Jose, CA (US); Ivan Popivanov, Markham (CA); Daniele Costante Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 11/849,154

(22) Filed: Aug. 31, 2007

(65) Prior Publication Data

US 2009/0063398 A1 Mar. 5, 2009

(51) Int. Cl.
G06F 17/30 (2006.01)

(52) U.S. Cl.
CPC .................. *G06F 17/30536* (2013.01)
USPC ......................................................... 707/688

(58) Field of Classification Search
USPC ................................. 707/200, 688
See application file for complete search history.

(56) References Cited

U.S. PATENT DOCUMENTS

| | | |
|---|---|---|
| 6,366,901 B1 | 4/2002 | Ellis |
| 6,934,701 B1 * | 8/2005 | Hall, Jr. .............................. 1/1 |
| 7,469,248 B2 * | 12/2008 | Agrawal et al. ....................... 1/1 |
| 2004/0186826 A1 * | 9/2004 | Choi et al. ............ 707/3 |
| 2005/0149584 A1 * | 7/2005 | Bourbonnais et al. ........ 707/204 |
| 2005/0192955 A1 * | 9/2005 | Farrell .............. 707/5 |
| 2005/0234900 A1 * | 10/2005 | Bossman et al. ................. 707/4 |
| 2006/0095405 A1 * | 5/2006 | Anderson et al. ................. 707/3 |
| 2006/0136499 A1 * | 6/2006 | Aboulnaga et al. ........... 707/200 |
| 2006/0149695 A1 * | 7/2006 | Bossman et al. ................ 706/48 |
| 2006/0168002 A1 | 7/2006 | Chesley |
| 2006/0195416 A1 | 8/2006 | Ewen et al. |
| 2006/0265385 A1 * | 11/2006 | Agrawal et al. ................. 707/10 |
| 2008/0133454 A1 * | 6/2008 | Markl et al. ..................... 707/2 |

OTHER PUBLICATIONS

Article entitled "Automatic table maintenance in DB2, Part 1: Automatic statistics collection in DB2 for Linux, UNIX, and Windows" by Papivanov et al., dated Jun. 7, 2007.*
Article entitled "Automatic table maintenance in DB2, Part 2: Automatic table and index reorganization in DB2 for Linux, UNIX, and Windows" by Papivanov et al., dated Jul. 12, 2007.*
Article entitled "Runstats for DlscoveryLinl Federated Database" by IBM, published on Nov. 8, 2002.*
Article entitled "Runstats for DiscoveryLink Federated Database" by IBM, dated Nov. 8, 2002.*
Article entitled "DB2 Stinger (now called v8.2) released" by SQL Manager, dated Sep. 23, 2004.*

(Continued)

*Primary Examiner* — Mahesh Dwivedi
(74) *Attorney, Agent, or Firm* — Sawyer Law Group, P.C.

(57) ABSTRACT

A method and system for collecting statistics on database tables. In one embodiment, the method includes identifying a plurality of tables for statistics collection, wherein each table of the plurality of tables are remote tables; examining at least one attribute for each table identified for statistics collection; prioritizing the tables for statistics collection based on the at least one attribute; and collecting statistics on the identified tables in a priority sequence.

14 Claims, 2 Drawing Sheets

(56) References Cited

OTHER PUBLICATIONS

Article entitled "Automated Statistics Collection in DB2 USB" by Aboulnaga et al., dated 2004.*

Kache, Holger, et al., "POP/FED: Progressive Query Optimization for Federated Queries in DB2," International Business Machines publication, pp. 1175-1179, Sep. 15, 2006.

* cited by examiner

STATISTICS COLLECTION FOR DATABASE TABLES

FIELD OF THE INVENTION

The present invention relates to databases, and more particularly to a method and system for collecting statistics on database tables.

BACKGROUND OF THE INVENTION

Structure Query Language (SQL) is a computer language for retrieving and managing data in a database system. SQL statements are used to query a database system for data. When compiling SQL statements, a query compiler determines estimated costs for different possible execution plans and compares these plans based on their estimated costs so that the lowest costing execution plan is chosen. These estimated costs are derived from operator-cost-estimation formulas and are accumulated over all the operations in a possible execution plan. These formulas use table, view, and nickname (remote table in a federated database system which is also called a heterogeneous distributed database system) statistics along with the database and system configuration information to calculate the operation costs including input/output (I/O), central processing unit (CPU), communication, buffer usage, and total time of execution costs.

In a federated system, remote tables are mapped on objects called nicknames. Users' SQL statements are received at a local system to be compiled and executed using local and remote system resources. The SQL statements refer to the remote tables using the nicknames explicitly in the statement, and the query compiler uses the nickname-to-remote table mapping information to generate a good query execution plan using the local and remote resources efficiently. Since the query compiler executes locally, it thus would require statistics on remote tables stored locally in these nicknames to make proper execution plans and estimates. For example, if a table is recorded as having a statistic of 1,000 pages and the operation is to perform a table scan on the table, the estimated I/O costs will require 1,000 pages being transferred from disk. However, if the table is actually stored on 1,000,000 pages on a disk, the table scan's actual transfer cost could be as much as 1,000 times more than the estimated cost. Assuming a 1,000 page statistic, the table scan is estimated to be lower than an index scan, and the operations contain an inequality predicate on the index key. It is possible that using the real number of pages of 1,000,000 would have made the table scan cost much higher than the index scan. Many examples exist where inaccurate statistics lead to inaccurate estimates and consequently where the query compiler selects suboptimal execution plans.

Because the query compiler's plan selection depends on having good database statistics, having accurate statistics for the database at the local server is imperative. Over time, the database could be modified such that its real estate deviates from previously collected statistics. Ensuring statistics are current for recurring SQL statement compilations is crucial.

Accordingly, what is needed is an improved method and system for collecting statistics on database tables. The present invention addresses such a need.

SUMMARY OF THE INVENTION

A method and system in accordance with the present invention for collecting statistics on database tables are disclosed. In one embodiment, the method includes identifying a plurality of tables for statistics collection, wherein each table of the plurality of tables are remote tables; examining at least one attribute for each table identified for statistics collection; prioritizing the tables for statistics collection based on the at least one attribute; and collecting statistics on the identified tables in a priority sequence. According to the system and method disclosed herein, the collected statistics may be used to update statistics metadata associated with each table.

DETAILED DESCRIPTION OF THE INVENTION

The present invention relates to databases, and more particularly to a method and system for collecting statistics on database tables. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for collecting statistics on database tables are disclosed. Embodiments of the present invention automatically maintain up-to-date statistics on database tables in a federated database system where there are local database tables and remote database tables. The method includes identifying a plurality of tables for statistics collection; examining at least one attribute for each table identified for statistics collection; prioritizing the tables for statistics collection based on the at least one attribute; and collecting statistics on the identified tables in a priority sequence. As a result, the collected statistics may be used to update statistics metadata associated with each table. To more particularly describe the features of the present invention, refer now to the following description in conjunction with the accompanying figures.

Figure 1:
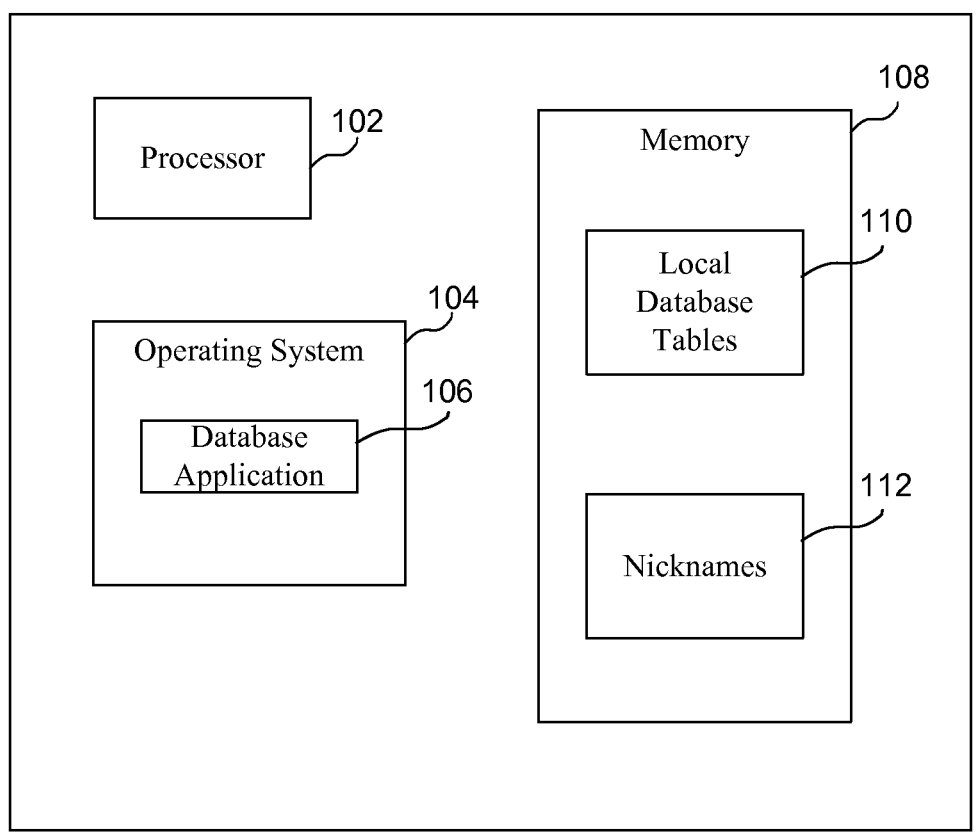
FIG. 1 is a block diagram of a database system in accordance with one embodiment of the present invention.

FIG. 1 is a block diagram of a database system 100 in accordance with one embodiment of the present invention. In one implementation, the database system is part of a federated database system. As FIG. 1 shows, the database system 100 includes a processor 102, an operating system 104, a database application 106, and memory 108 that stores one or more local database tables 110 and one or more nicknames 112. The application 106 may be stored on any suitable storage location or computer-readable medium. The application 106 provides instructions that enable the processor 102 to perform the functions described herein.

In one embodiment, a nickname 112 is a local version of a remote table in a database system. In other words, a nickname is a place holder on the local system that describes the metadata needed by the local query compiler to refer to the remote table including table schema and statistics. A nickname may also include information about which server the table is located and the remote table name. In one embodiment, the database application 106 maintains statistics on the local tables as well as indexes to nickname (remote table) statistics. The database application 106 may add the embodiments described herein to existing statistics collection mechanisms to provide up-to-date statistics synchronization during normal operations of the database system.

In one embodiment, to incorporate nicknames with the local tables, the database application may add scripts that retrieve the table information to process the automated features described herein. Such table information may include, for example, data related to the name of the nicknames, the last time statistics were collected (referred to herein as STATS_TIME), the next time these tables are scheduled to be evaluated for statistics collection, etc. Such table information may also include retrieving information about the server and remote table name to which the nickname refers. The database application 106 may use the server information to centralize the information used for all nicknames on the same server. For example, nicknames on the same server may reference a server structure, and the server structure will have information collected related to the status of the server. Also, the server name as well as the possible server type may be collected, which could help guide whether to obtain statistics on them.

Figure 2:
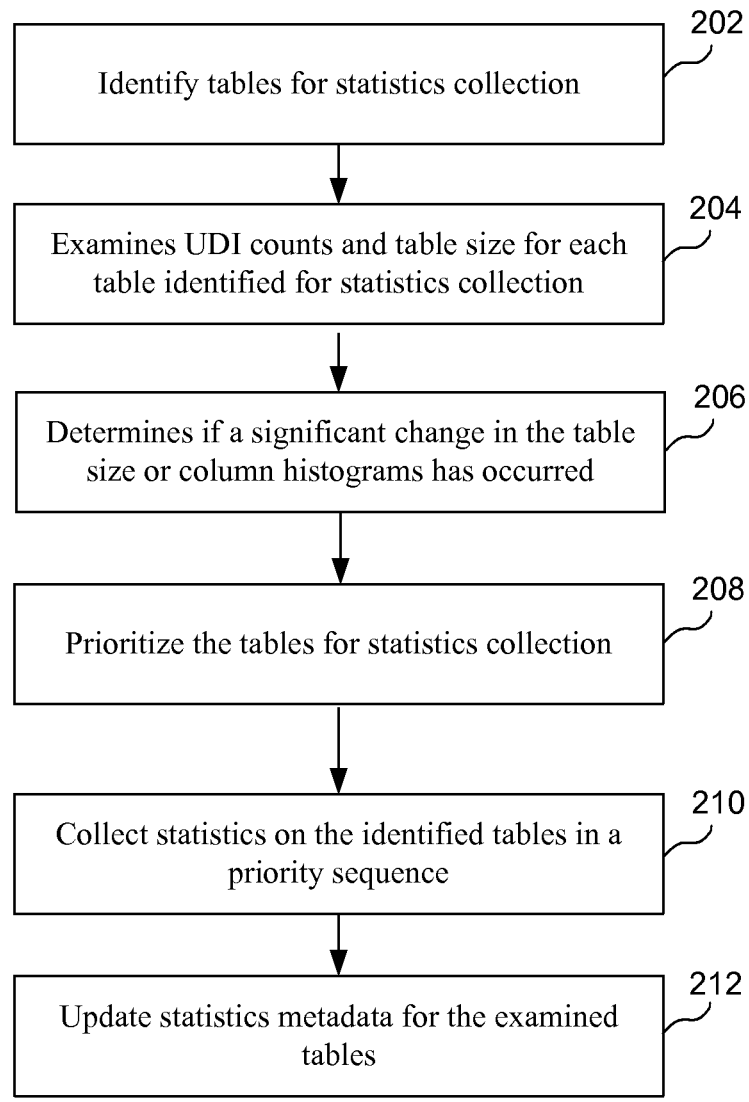
FIG. 2 is a flow chart showing a method for collecting statistics on database tables in accordance with one embodiment of the present invention.

FIG. 2 is a flow chart showing a method for collecting statistics on database tables in accordance with one embodiment of the present invention. Referring to both FIGS. 1 and 2 together, the process begins in step 202 where the database application 106 identifies tables for statistics collection. In one embodiment, the database application 106 may identify local tables as possibly needing statistics collection based on one or more policies. For example, in one embodiment, for a given table, the database application 106 may perform a statistics collection operation on the table based on a schedule (e.g., after a predefined time period after the last time statistics were collected for that table) (e.g., every 2 hours). In one embodiment, the database application 106 incorporates new nicknames with local table information at the start of each periodic invocation of the feature. In one embodiment, after a predefined time period (e.g., every 2 hours), an automatic statistics collection feature in the database application 106 wakes up and the database application 106 determines which tables and nicknames to consider for updates. When the database application 106 starts, it will account for any new nicknames that exist and include these in its update processes.

In another embodiment, for a given table, the database application 106 may perform a statistics collection operation based on an indicator (e.g., update/delete/insert (UDI) counters). A UDI counter tracks how much change occurred on a given table compared to the last time statistics were collected for the table. In one embodiment, a statistics collection policy may define what tables are considered in the method of FIG. 2. Such a statistics collection policy allows users to narrow the list of nicknames and local tables that are considered. Examples of such a policy may include: only collecting statistics on nicknames and not local tables, only collecting statistics on local tables and for nicknames for remote tables on particular servers (e.g., servers 1, 2, and 3 but not server 4).

In particular embodiments, the database application 106 may identify nicknames as possibly needing statistics collection based on reasons different from local tables. UDI counters do not usually exist for nicknames on the local server as they are merely place holders for statistics used by the compiler. Also, the local statistics STATS_TIME on the nickname indicates the last time the nickname was handled and does not necessarily indicate the last time the remote table statistics were collected for the nickname. In one embodiment, the database application 106 addresses this issue by using a new API in which the database application 106 obtains the STATS_TIME of the remote table as well as the maximum STATS_TIME of the remote server. If the remote STATS_TIMEs are no different then the last time the database application 106 obtained statistics, the database application 106 may ignore processing that particular nickname. However, if the remote STATS_TIMEs are more recent, the database application 106 may identify the nicknames as needing statistics collection.

Next, in step 204, the database application 106 examines one or more attributes of each table identified for statistics collection. In one embodiment, attributes may include STATS_TIMEs and table sizes.

Next, in step 206, the database application 106 determines if a significant change in the table size or column histograms has occurred. The database application 106 may determine the column histograms by sampling. In one embodiment, the database application 106 may determine if a significant change happened by executing a sampling API for the statistics on the remote server and/or take the time difference between the STATS_TIME for the local nickname compared to the remote table STATS_TIME (potentially multiplied by the difference in the nickname number of rows statistic with the remote table's samples number of rows). This latter sampling of a change in nickname-to-remote statistics may be similar to sampling UDI changes. In particular embodiments, there are no UDI counters from the remote table and server. In one embodiment, the database application 106 flags nicknames for statistics collection in order to determine if their metadata has changed on the remote site. This is done using an API to bring the metadata to the local server or to obtain alteration times of the remote table. The database application 106 then compares those times with the times that the database application 106 defined the nicknames.

Next, in step 208, the database application 106 prioritizes the tables for statistics collection based on the table attributes. In one embodiment, the tables are prioritized in the order in which the database application 106 determines if the statistics metadata is out of date. In one embodiment, the database application 106 may group local tables into multiple groups and then order the groups. In one embodiment, the database application 106 gives a higher priority (e.g., urgent) to groups of tables that have never had their statistics collected or that have been ignored for a predefined time period or number of times.

In one embodiment, the database application 106 may group nicknames in the same way that the tables are grouped, since the database application 106 may determine if any statistics on these nicknames have ever been collected or if they were similarly ignored. In one embodiment, nicknames may also fall into a high-priority group if their statistics metadata on the local server is possibly different from the statistics metadata on their associated remote table on the remote server. In particular embodiments, the grouping and ranking of tables is performed whether the tables are local or remote, and the ranking and grouping orders both nicknames and local tables in the same list. Nickname grouping and ranking is merged into the ranking and grouping of the local tables. In other words, the database application 106 groups and ranks nicknames among each other and then among local tables. For example, in one embodiment, rankings may be based on how out-of-date the statistics are. In one embodiment, rankings may be based on the degree of difference of a local table's number of rows compared with a sampled number of rows (both for a local or remote table).

In one embodiment, a given group (of tables or nicknames) may be given a higher priority based on one more maintenance metrics such as UDI counters or degree of change between a current statistics such as number of rows compared to a sample of the real number of rows for the nickname or table. In one embodiment, if a given group is not given a higher priority, the group may be given a low priority by default.

In one embodiment, nicknames and local tables within a group may be weighted such that the ones with the highest weight are the first in the ordering to be examined. The database application may apply various weighting factors for the ordering. For example, nicknames may be ordered based on the time difference between the current time and the last recorded examination.

Nicknames may be ordered among local tables based on various methods. One method may be based on the cardinality or size of the nickname compared to other nicknames or compared to local tables. In one embodiment, the database application 106 may order tables based on size. For example, the database application 106 may give smaller tables a higher priority, because smaller tables may require faster statistics collection. In one embodiment, the database application 106 may provide a weighting based on the type of table (e.g., whether a nickname or table is a fact table or dimension table). In some scenarios, fact tables change more and query plans hinge on these large tables being properly estimated correctly. As such, the database application may give fact tables priority over dimension tables. In one embodiment, the database application 106 may order nicknames and local tables based on certain the age of their respective statistics. In one embodiment, the database application 106 may use comparisons to rank local tables and nicknames with each other. When the database application 106 compares two local tables for ranking, the database application 106 may use one comparison method. When the database application 106 ranks nicknames among themselves, the database application 106 may use another comparison method. When the database application 106 compares a nickname to a local table, the database application 106 may use a different method to determine rankings.

Next, in step 210, the database application 106 collects statistics on the identified tables in priority sequence. Nickname statistics may be collected in a number of ways. In one embodiment, the database application 106 may query a given remote server for its catalog statistics. In one embodiment, the database application 106 may run statistics queries on a given remote server. Running statistics queries may involve running queries such as "SELECT COUNT(*) FROM <REMOTE TABLE>" to get the table cardinality. While querying for catalog statistics may be faster than running statistics queries remotely, running statistics queries may obtain up-to-date and accurate information. In some scenarios, if there are no nickname statistics locally, it may be easiest for the database application 106 to obtain the statistics from the remote catalog. If no statistics existed remotely, the database application 106 may then run statistics queries.

Based on the collected statistics, the database application 106 determines if there are differences between the nickname definitions and the remote tables to which the nickname references. Differences may result from changes to indexes on a nickname or differences to the actual indexes on the remote table.

In one embodiment, the database application 106 may sample remote tables to determine and flag nicknames that have statistics that are different from what is in the local database server catalog, such that ones with little or no difference may be ignored. As such, the database application 106 may not update the nicknames associated with these remote tables during the statistics collection operation. The database application 106 may determine based on the samplings of statistics whether some remote statistics metadata are sufficiently different from the local cataloged statistics to warrant a full table statistics collection. In other words, sampled statistics from remote tables may be compared to the nickname statistics to determine how different the sample is compared to to what is known. If the difference is larger, the nickname statistics are more out-of-date or out of synch with the remote table. Thus, the database application 106 may place a higher priority on updating the statistics of the more out-of-date nickname.

In one embodiment, the database application 106 may also ignore nicknames associated with a problematic remote table or remote server. A remote table or remote server may be problematic, for example, if the remote server is being non-responsive or if there is an error associated with the remote table. Ignoring some nicknames may minimize delays that may affect operations of the database application 106.

In particular embodiments, both methods may be implemented using the same application programming interface (API) with different arguments to simplify the communication and interface between the database application 106 and a given remote server. This same API for a given nickname statistics collection may be enhanced to run statistics queries to get a sample of the remote table statistics. In one embodiment, the database application 106 may collect samples as a first level of statistics collection on local tables on existing automated features. The database application 106 may utilize API sampling for nicknames and compare the sample with the currently cataloged statistics at the local server to determine whether the views or nicknames truly need full table statistics collection. Execution of the sampling and execution of full table statistics collection may either be executed immediately or scheduled to be run on a separate automated process whose output is passed back to this automated feature.

Based on the statistics collected, the database application 106 may determine which statistics metadata is out-of-date and needs updating. Next, in step 212, the database application 106 updates statistics metadata for the examined tables. The database application 106 automatically synchronizes local nickname statistics metadata, including indexes to remote tables, with corresponding statistics metadata of the remote table in order to provide accurate and up-to-date statistics for the compiler. In one embodiment, the database application 106 automatically performs such update operations without requiring intervention from a user and may automatically send messages to the user indicating any changes in statistics metadata. The database application 106 catalogs any new nickname statistics metadata with local table statistics for future determinations of needed statistics metadata updates.

According to the system and method disclosed herein, the present invention provides numerous benefits. For example, embodiments of the present invention ensure that statistics metadata associated with database tables are updated and accurate.

A method and system for collecting statistics on database tables has been disclosed. The method includes identifying a plurality of tables for statistics collection; examining at least one attribute for each table identified for statistics collection; prioritizing the tables for statistics collection based on the at least one attribute; and collecting statistics on the identified tables in a priority sequence.

The present invention has been described in accordance with the embodiments shown. One of ordinary skill in the art will readily recognize that there could be variations to the embodiments, and that any variations would be within the spirit and scope of the present invention. For example, embodiments of the present invention may be implemented using hardware, software, a computer-readable medium containing program instructions, or a combination thereof. Software written according to the present invention or results of the present invention may be stored in some form of computer-readable medium such as memory, hard drive, CD-ROM, DVD, or other media for subsequent purposes such as being executed or processed by a processor, being displayed to a user, etc. Also, software written according to the present invention or results of the present invention may be transmitted in a signal over a network. In some embodiments, a computer-readable medium may include a computer-readable signal that may be transmitted over a network. Accordingly, many modifications may be made by one of ordinary skill in the art without departing from the spirit and scope of the appended claims.

What is claimed is:

1. A method for collecting statistics on database tables, the method comprising:
    identifying a plurality of local tables and a plurality of nicknames for statistics collection in accordance with a statistics collection policy, wherein each table of the plurality of local tables is located on a local server and is remote from a plurality of remote tables located on a remote server, wherein the plurality of remote tables are mapped onto objects on the local server via the plurality of nicknames, wherein the statistics collection policy includes a first reason for collecting the plurality of local tables and a second reason for collecting the plurality of nicknames, wherein the first reason comprises collecting the plurality of local tables based on update/delete/insert (UDI) counts and the second reason comprises collecting the plurality of nicknames by comparing both a remote STATS TIME and a maximum STATS TIME to a local STATS TIME, wherein the plurality of nicknames are collected if the remote STATS TIME and the maximum STATS TIME is more recent than the local STATS TIME;
    examining at least one attribute for each table and nickname of the plurality of local tables and the plurality of nicknames identified for the statistics collection;
    prioritizing the plurality of local tables and the plurality of nicknames for the statistics collection based on the examining to create a priority sequence;
    collecting statistics on each table and nickname of the plurality of local tables and the plurality of nicknames identified for the statistics collection in accordance with the priority sequence; and
    automatically synchronizing the collected statistics, wherein local nickname statistics metadata are automatically synchronized with corresponding statistics metadata in the plurality of remote tables.

2. The method of claim 1 wherein the identifying comprises determining if a significant change in the table size has occurred.

3. The method of claim 1 further comprising updating statistics metadata for the plurality of local tables for which the statistics collection was performed.

4. The method of claim 1 wherein the prioritizing is based on the size of the tables.

5. The method of claim 1 wherein the prioritizing is based how much change has occurred on a given table compared to a previous time statistics were collected for the given table.

6. A non-transitory computer-readable medium containing program instructions for collecting statistics on database tables, the program instructions which when executed by a computer system cause the computer system to execute a method comprising:
    identifying a plurality of local tables and a plurality of nicknames for statistics collection in accordance with a statistics collection policy, wherein each table of the plurality of local tables is located on a local server and is remote from a plurality of remote tables located on a remote server, wherein the plurality of remote tables are mapped onto objects on the local server via the plurality of nicknames, wherein the statistics collection policy includes a first reason for collecting the plurality of local tables and a second reason for collecting the plurality of nicknames, wherein the first reason comprises collecting the plurality of local tables based on update/delete/insert (UDI) counts and the second reason comprises collecting the plurality of nicknames by comparing both a remote STATS TIME and a maximum STATS TIME to a local STATS TIME, wherein the plurality of nicknames are collected if the remote STATS TIME and the maximum STATS TIME is more recent than the local STATS TIME,
    examining at least one attribute for each table and nickname of the plurality of local tables and the plurality of nicknames identified for the statistics collection;
    prioritizing the plurality of local tables and the plurality of nicknames for the statistics collection based on the examining to create a priority sequence;
    collecting statistics on each table and nickname of the plurality of local tables and the plurality of nicknames identified for the statistics collection in accordance with the priority sequence; and
    automatically synchronizing the collected statistics, wherein local nickname statistics metadata are automatically synchronized with corresponding statistics metadata in the plurality of remote tables.

7. The computer-readable medium of claim 6 wherein the identifying comprises determining if a significant change in the table size has occurred.

8. The computer-readable medium of claim 6 further comprising updating statistics metadata for the plurality of local tables for which the statistics collection was performed.

9. The computer-readable medium of claim 6 wherein the prioritizing is based on the size of the tables.

10. The computer-readable medium of claim 6 wherein the prioritizing is based how much change has occurred in a given table compared to a previous time statistics were collected for the given table.

11. A system for collecting statistics on database tables, the system comprising:
    a database application;
    a processor;
    a memory coupled to the processor; and
    a plurality of tables stored on the memory, wherein the processor is operable to:
        identify a plurality of local tables and a plurality of nicknames for statistics collection in accordance with a statistics collection policy, wherein each table of the plurality of local tables is located on a local server and is remote from a plurality of remote tables located on a remote server, wherein the plurality of remote tables are mapped onto objects on the local server via the plurality of nicknames, wherein the statistics collection policy includes a first reason for collecting the plurality of local tables and a second reason for collecting the plurality of nicknames, wherein the first reason comprises collecting the plurality of local tables based on update/delete/insert (UDI) counts and the second reason comprises collecting the plurality of nicknames by comparing both a remote STATS TIME and a maximum STATS TIME to a local STATS TIME, wherein the plurality of nicknames are collected if the remote STATS TIME and the maximum STATS TIME is more recent than the local STATS TIME;

examine at least one attribute for each table and nickname of the plurality of local tables and the plurality of nicknames identified for the statistics collection;

prioritize the plurality of local tables and the plurality of nicknames for the statistics collection based on the examining to create a priority sequence;

collect statistics on each table and nickname of the plurality of local tables and the plurality of nicknames identified for the statistics collection in accordance with the priority sequence; and automatically synchronize the collected statistics, wherein local nickname statistics metadata are automatically synchronized with corresponding statistics metadata in the plurality of remote tables.

12. The system of claim 11 wherein, to identify a plurality of local tables for the statistics collection, the processor determines if a significant change in the table size has occurred.

13. The system of claim 11 wherein the processor updates statistics metadata for the plurality of local tables for which statistics collection was performed.

14. The system of claim 11 wherein the processor prioritizes the plurality of local tables for statistics collection based on the size of the tables.

* * * * *